United States Patent
Tomura et al.

(10) Patent No.: US 9,505,458 B2
(45) Date of Patent: Nov. 29, 2016

(54) LINK MECHANISM PROTECTION STRUCTURE FOR SADDLE TYPE VEHICLE

(71) Applicant: HONDA MOTOR CO., LTD., Tokyo (JP)

(72) Inventors: Kineo Tomura, Wako (JP); Yotaro Mori, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/800,981

(22) Filed: Jul. 16, 2015

(65) Prior Publication Data
US 2016/0031511 A1 Feb. 4, 2016

(30) Foreign Application Priority Data
Jul. 31, 2014 (JP) .................. 2014-156940

(51) Int. Cl.
*B62J 23/00* (2006.01)
*B62K 25/02* (2006.01)
*B62K 25/28* (2006.01)

(52) U.S. Cl.
CPC ............ *B62J 23/00* (2013.01); *B62K 25/02* (2013.01); *B62K 25/283* (2013.01); *B62K 25/286* (2013.01)

(58) Field of Classification Search
CPC ..... B62J 23/00; B62K 25/283; B62K 25/286
USPC ........................................ 280/283
See application file for complete search history.

(56) References Cited

U.S. PATENT DOCUMENTS

| | | | | |
|---|---|---|---|---|
| 4,673,053 A * | 6/1987 | Tanaka | B62K 25/286 180/227 |
| 5,592,999 A * | 1/1997 | Matsuura | B62K 25/283 180/227 |
| 5,791,674 A * | 8/1998 | D'Aluisio | B62K 25/286 180/227 |
| 6,691,814 B2 * | 2/2004 | Toyoda | B62K 25/286 180/219 |
| 7,226,066 B2 * | 6/2007 | Ichihara | B62K 25/283 180/227 |
| 7,559,566 B2 * | 7/2009 | Fujita | B62K 25/286 180/218 |
| 7,644,797 B2 * | 1/2010 | Kofuji | B62K 25/283 180/219 |
| 8,186,470 B2 * | 5/2012 | Matayoshi | B60T 8/3685 180/227 |
| 8,474,566 B2 * | 7/2013 | Nimura | B62M 17/00 180/226 |
| 8,851,222 B1 * | 10/2014 | Katsura | B62K 11/04 180/219 |
| 2015/0076792 A1 * | 3/2015 | Stillwell | B62K 25/04 280/304.3 |

FOREIGN PATENT DOCUMENTS

JP 62-105892 A 5/1987

* cited by examiner

*Primary Examiner* — Joseph Rocca
*Assistant Examiner* — Michael Stabley
(74) *Attorney, Agent, or Firm* — Birch, Stewart, Kolasch & Birch, LLP

(57) ABSTRACT

A link mechanism includes a shock absorber rod pivotally supported in an upwardly and downwardly swingable manner on a body frame. A shock absorber arm is disposed between a pair of left and right rod portions constituting the shock absorber rod. A front end portion of the shock absorber arm is connected to a lower end portion of a shock absorber unit, a rear upper end portion is connected to a swing arm, and a rear lower end portion is connected to a rear end portion of the shock absorber rod. A link guard covers at least an area from a front end portion of the shock absorber rod to the front end portion of the shock absorber arm on the lower side thereof to be fixed to and to spread over the pair of left and right rod portions.

17 Claims, 13 Drawing Sheets

LINK MECHANISM PROTECTION STRUCTURE FOR SADDLE TYPE VEHICLE

CROSS-REFERENCE TO RELATED APPLICATIONS

The present application claims priority under 35 USC 119 to Japanese Patent Application No. 2014-156940 filed Jul. 31, 2014 the entire contents of which are hereby incorporated by reference.

BACKGROUND OF THE INVENTION

1. Field of the Invention

The present invention relates to a link mechanism protection structure for a saddle type vehicle including a link guard for covering, from below, a link mechanism connected to a body frame, a swing arm and a shock absorber unit.

2. Description of Background Art

A technique for realizing both assured strokes at normal times with a reliable load bearing in a fully collapsed or contracted (full-stroke) state of a shock absorber unit is known with a swing arm type suspension in which a link mechanism is provided at a lower end portion of a shock absorber unit. See, for example, Japanese Utility Model Laid-Open No. Sho 62-105892.

The aforementioned link mechanism is composed of comparatively small component parts and includes movable parts. Accordingly, there has been a demand for avoiding collision of muddy water, sand, rock or the like against the link mechanism.

In this mechanism it is contemplated to cover the lower side of the link mechanism with a skid plate. Japanese Utility Model Laid-Open No. Sho 62-105892 discloses a structure in which a swing arm is covered over a wide range by a skid plate. The disclosed structure, however, has a problem in that the unsprung weight is likely to become larger.

SUMMARY AND OBJECTS OF THE INVENTION

It is an object of an embodiment of the present invention to provide a link mechanism protection structure for a saddle type vehicle wherein the unsprung weight can be made smaller.

In order to solve the aforementioned problems, according to an embodiment of the present invention, there is provided a link mechanism protection structure for a saddle type vehicle including a body frame (F) with a swing arm (11) having a front end portion pivotally supported in an upwardly and downwardly swingable manner by a pivot shaft (24) disposed at a lower portion of the body frame (F), the swing arm (11) adapted to support a rear wheel (3) in a rotatable manner on a rear end portion thereof. A shock absorber unit (26) is adapted to restrict an amount of swinging of the swing arm (11) relative to the body frame (F). The shock absorber unit (26) has an upper end portion connected to the body frame (F). A link mechanism (25) is connected to a lower end portion of the shock absorber unit (26), to the swing arm (11) and to the body frame (F). A link guard (85) is disposed under the link mechanism (25). In the link mechanism protection structure, the link mechanism (25) includes a shock absorber rod (91) pivotally supported in an upwardly and downwardly swingable manner by the body frame (F) in a position under the pivot shaft (24) with a shock absorber arm (93) disposed between a pair of left and right rod portions (91b) constituting the shock absorber rod (91). Of the shock absorber arm (93), a front end portion is connected to a lower end portion of the shock absorber unit (26), a rear upper end portion is connected to the swing arm (11), and a rear lower end portion is connected to a rear end portion of the shock absorber rod (91). In addition, the link guard (85) is disposed so as to cover at least an area ranging from a front end portion of the shock absorber rod (91) to the front end portion of the shock absorber arm (93) on a lower side of the area in such a manner so as to spread over the pair of left and right rod portions (91b). The link guard (85) is fixed at least to the pair of left and right rod portions (91b).

In the link mechanism protection structure configured as above, a front end portion of the link guard (85) may be formed so as to upwardly enfold a front end portion of the shock absorber rod (91), and the front end portion of the link guard (85) may be bent in cross-sectional shape.

In addition, according to an embodiment of the present invention, the front end portion of the shock absorber rod (91) may include left and right large-diameter portions (91e) each provided with a bearing (112) inside thereof. A small-diameter portion (91f) is provided integrally between the left and right large-diameter portions (91e) and smaller than the large-diameter portions (91e) in outside diameter. Further, the front end portion of the link guard (85) may be so bent in cross section that a central portion (85u) thereof with respect to a vehicle width direction is protuberant toward a radially inner side of the small-diameter portion (91f), in such a manner so as to be along the shape of the front end portion of the shock absorber rod (91).

According to an embodiment of the present invention, the front end portion of the link guard (85) may be provided, in a position corresponding to the small-diameter portion (91f), with a passing hole (85m) through which to pass a string-like member (96), and the string-like member (96) passed through the passing hole (85m) may be wound around the small-diameter portion (91f), whereby the front end portion of the link guard (85) is supported on the front end portion of the shock absorber rod (91).

In addition, according to an embodiment of the present invention, a front end guard portion (85a) constituting the front end portion of the link guard (85) may include left and right side portions (85t) formed so as to be along the left and right large-diameter portions (91e), and the side portions (85t) may be formed to be larger in diameter than the string-like member (96) in the wound state.

According to an embodiment of the present invention, the link guard (85) may extend further rearwardly from the front end portion of the shock absorber arm (93), and may be provided with a mud-discharging opening (85j) under the shock absorber arm (93).

In addition, according to an embodiment of the present invention, the link guard (85) may have a slide surface portion (85f) inclined at a forwardly upward gradient substantially along a straight line (109) which touches, from front side in side view, both the front end portion of the shock absorber rod (91) and the front end portion of the shock absorber arm (93) connected to the shock absorber unit (26) being in a fully stretched state.

According to an embodiment of the present invention, the link guard (85) may have left and right side walls (85k), and the side walls (85k) may each be formed with a stepped portion (85s).

In addition, according to an embodiment of the present invention, the link guard (85) may be formed with a pair of left and right side portion extension portions (85c) extending sideways and upwardly from the left and right side walls (85*k*). The pair of left and right side portion extension portions (85*c*) may be disposed on laterally outer sides of the pair of left and right rod portions (91*b*).

According to an embodiment of the present invention, the left and right side walls (85*k*) may each be provided therein with a plurality of passing holes (85*m*) through which to pass string-like members (96), and the side portion extension portions (85*c*) may be fixed to the rod portions (91*b*) by the string-like members (96) passed through the passing holes (85*m*).

In addition, according to an embodiment of the present invention, the link guard (85) may be formed with a pair of left and right rear portion sideways extension portions (85*e*) extending sideways from a position under a connection portion between a rear end portion of the shock absorber rod (91) and the rear lower end portion of the shock absorber arm (93).

Further, according to an embodiment of the present invention, the rear upper end portion of the shock absorber arm (93) may be connected to an arm projecting portion (11*a*) projecting downwardly integrally from a lower portion of the swing arm (11) to below an arm main body (11*b*) in side view.

According to an embodiment of the present invention, the link mechanism includes the shock absorber rod pivotally supported in an upwardly and downwardly swingable manner by the body frame in a position under the pivot shaft. The shock absorber arm is disposed between the pair of left and right rod portions constituting the shock absorber rod. With respect to the shock absorber arm, a front end portion is connected to a lower end portion of the shock absorber unit, a rear upper end portion is connected to the swing arm, and a rear lower end portion is connected to a rear end portion of the shock absorber rod. In addition, the link guard is disposed so as to cover at least an area ranging from a front end portion of the shock absorber rod to the front end portion of the shock absorber arm on the lower side of the area in such a manner so as to spread over the pair of left and right rod portions, and is fixed at least to the pair of left and right rod portions. According to an embodiment of the present invention, only the required minimal part of the link mechanism is guarded by the link guard. Therefore, the link guard can be made lighter in weight and compact, which also contributes to a reduction in the unsprung weight.

A front end portion of the link guard is formed so as to upwardly enfold a front end portion of the shock absorber rod, and the front end portion of the link guard is bent in a cross-sectional shape. Since the front end portion of the link guard is formed so as to upwardly enfold the front end portion of the shock absorber rod, therefore, the link guard can be restrained from coming off (turning over) to the lower side due to collision of an obstacle against the link guard. In addition, since the link guard is bent in a cross-sectional shape, its rigidity can be ensured easily.

In addition, a front end portion of the shock absorber rod includes the left and right large-diameter portions provided with the bearings on the inner sides thereof. The small-diameter portion is provided integrally between the left and right large-diameter portions and smaller than the large-diameter portions in outside diameter. The front end portion of the link guard is bent in cross section so that a vehicle-width-directionally central portion thereof protrudes toward the radially inner side of the small-diameter portion, in such a manner so as to be along the shape of the front end portion of the shock absorber rod. Therefore, with the front end portion of the link guard thus bent to be along the shape of the shock absorber rod, the rigidity of the front end portion of the link guard can be enhanced while utilizing a dead space.

The front end portion of the link guard is provided, in a position corresponding to the small-diameter portion, with the passing hole through which to pass the string-like member. The string-like member, passed through the passing hole, is wound around the small-diameter portion, whereby the front end portion of the link guard is supported on the front end portion of the shock absorber rod. Thus, the front end portion of the link guard can be bound by the string-like member. Accordingly, the aforementioned coming-off (turning-over) of the link guard to the lower side can be inhibited more assuredly. In addition, since the string-like member is wound around the small-diameter portion, the length of the string-like member can be minimized.

In addition, the front end guard portion constituting a front end portion of the link guard includes the left and right side portions formed so as to be along the left and right large-diameter portions. The side portions are formed to be larger in diameter than the string-like members in the wound state. Thus, the side portions larger in diameter than the string-like members in the wound state are provided on both sides of the string-like members. Accordingly, the possibility of collision of a stump or a large rock against the string-like members can be lowered. Consequently, the possibility of breakage of the string-like members can be reduced.

The link guard extends further rearward from a front end portion of the shock absorber arm, and is provided with the mud-discharging hole under the shock absorber arm. Therefore, the region guarded by the link guard can be broadened. In addition, since the mud-discharging hole is provided, mud or the like, if any, present in or clogging a gap between the link guard and the shock absorber arm will be discharged through the mud-discharging hole, so that the mud or the like will not hinder the operation of the shock absorber arm.

In addition, the link guard has the slide surface portion inclined at a forwardly upward gradient substantially along the straight line which touches, from the front side in side view, both the front end portion of the shock absorber rod and a front end portion of the shock absorber arm connected to the shock absorber unit being in a fully stretched state. Therefore, even when a rock, soil, sand or the like collides against the link guard, the shock of collision can be mitigated by the forwardly ascending slide surface portion.

The link guard has the left and right side walls, which are formed with the stepped portions, respectively. Therefore, the rigidity of the link guard can be enhanced by the stepped portions. In addition, with the stepped portions thus provided, the volume of the inside of the link guard can be reduced, whereby the amount of mud and the like accumulated inside the link guard can be reduced.

In addition, the link guard is formed with a pair of left and right side portion extension portions extending sideways and upwardly from the left and right side walls. The pair of left and right side portion extension portions are disposed on laterally outer sides of the pair of left and right rod portions. Therefore, the link guard can be positioned in the vehicle width direction relative to the shock absorber rods by the left and right side portion extension portions.

The left and right side walls are each provided with the plurality of passing holes through which to pass the string-like members, and the side portion extension portions are fixed to the rod portions by the string-like members passed through the passing holes. Therefore, the link guard can be easily fixed to the rod portions by the string-like members.

In addition, the provision of the side portion extension portions ensures that the link guard can be firmly fixed to the rod portions.

In addition, the link guard is formed with the pair of left and right rear portion sideways extension portions extending sideways from the lower side of the connection portions between the rear end portions of the shock absorber rod and the rear lower end portions of the shock absorber arm. Therefore, in the case where the rear end portions of the shock absorber rod and the rear lower end portion of the shock absorber arm are connected by the connecting bolt, the head portion of the connecting bolt and the nut screw-engaged with the tip portion of the connecting bolt can be covered with, and protected by, the rear portion sideways extension portions from below.

Further, the rear upper end portion of the shock absorber arm is connected to the arm projecting portions projecting downward integrally from a lower portion of the swing arm to below the arm main body in side view. Therefore, the link mechanism is of a type wherein the shock absorber arm and the shock absorber rod are largely spaced downwardly from the arm main body of the swing arm. However, since the link guard is mounted to the shock absorber rod, the link guard may be smaller as compared with the case of the related art where a guard is mounted to a swing arm main body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
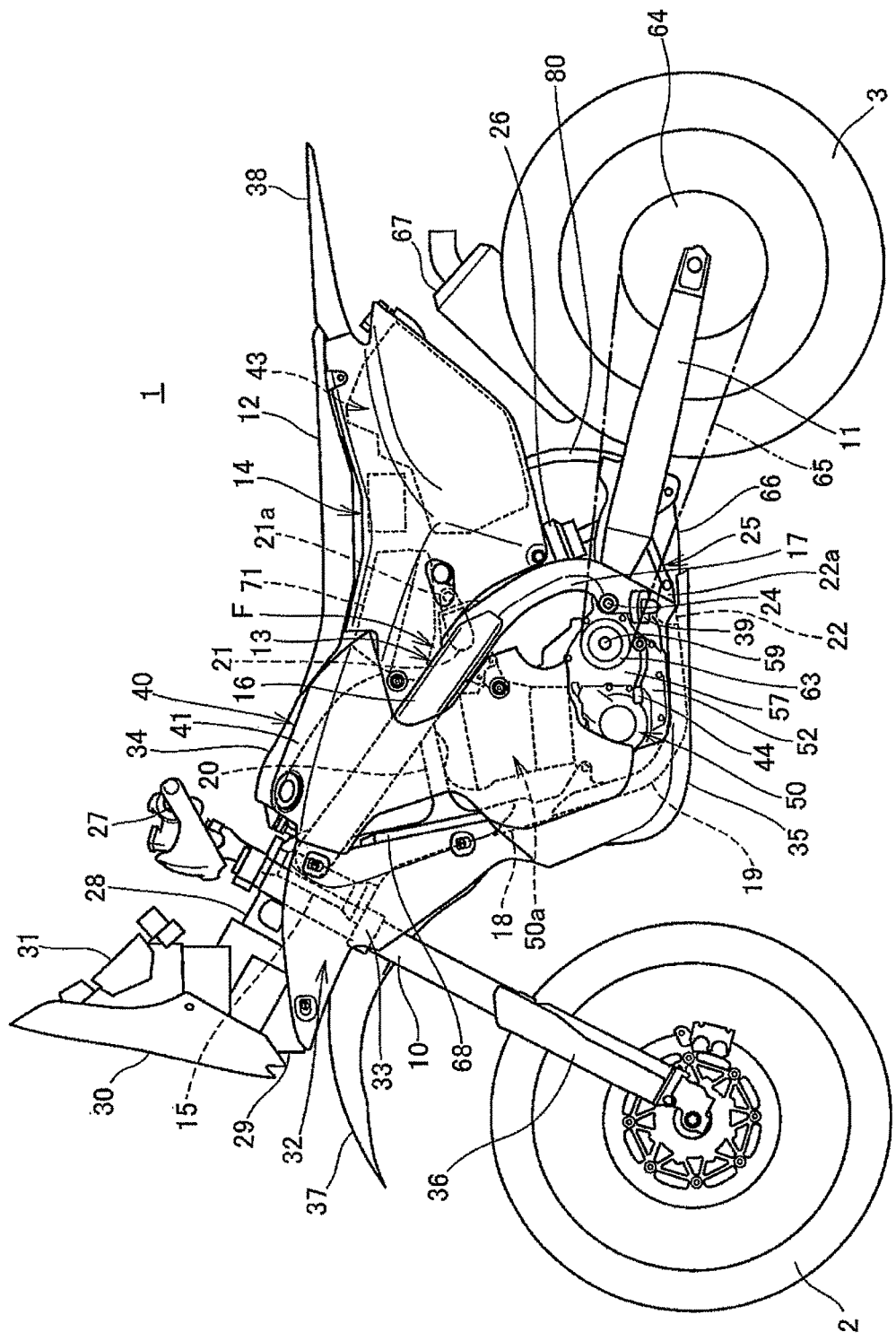
FIG. 1 is a left side view of a motorcycle having a link mechanism protection structure of the present invention.

One embodiment, shown by way of example, of the present invention will be described below, referring to the drawings. In the description, the directions such as forward and rearward directions, leftward and rightward directions, and upward and downward directions are the same as those directions with reference to a vehicle body, unless otherwise specified. In addition, symbol FR shown in the drawings indicates the front side (forward direction) of the vehicle body, and symbol LH indicates the left-hand side (leftward direction) of the vehicle body.

FIG. 1 is a left side view of a motorcycle 1 having a link mechanism protection structure according to the present invention.

The motorcycle 1 is a vehicle includes an engine 50, as a power unit, supported on a body frame F with a front fork 10 steerably supporting a front wheel 2 supported on a front end of the body frame F. A swing arm 11, for supporting a rear wheel 3, is supported on a lower portion of the body frame F.

In addition, the motorcycle 1 is a saddle type vehicle wherein a seat 12 on which a rider is to be seated astride is provided over a longitudinal-vehicle-directionally central portion of the body frame F. Furthermore, the motorcycle 1 is an off-road type vehicle suited for traveling on uneven grounds such as sand. The motorcycle 1 has a large suspension stroke and a large-type fuel tank 40.

The body frame F includes a front frame 13 formed in a cage form by joining pipe members and plate members by welding or the like with a resin-made rear frame 14 connected to a rear portion of the front frame 13.

The front frame 13 includes a head pipe 15 provided at a front end with a pair of left and right main frames 16 extending obliquely rearwardly and downwardly from the head pipe 15, and a pair of left and right pivot frames 17 extending downwardly respectively from rear ends of the main frames 16. In addition, the front frame 13 includes a down frame 18 extending obliquely downwardly and rearwardly from a rear surface of a lower portion of the head pipe 15 with a pair of left and right under frames 19 branching to the left and right from the down frame 18, extending downwardly, then bending to the rear side to be substantially horizontal, and connected respectively to lower ends of the pivot frames 17.

In addition, the front frame 13 includes reinforcement frames 20 interconnecting an upper portion of the down frame 18 and longitudinal-vehicle-directionally middle portions of the left and right main frames 16. Further, the front frame 13 includes an upper cross member 21 connecting upper portions of the left and right pivot frames 17 to each other in the vehicle width direction, and a lower cross member 22 connecting lower portions of the left and right pivot frames 17 to each other in the vehicle width direction.

Rear portions of the left and right main frames 16, upper portions of the left and right under frames 19, and front ends of horizontal portions of the left and right under frames 19 support the engine 50.

A pivot shaft 24 is provided at lower portions of the left and right pivot frames 17, and a front end portion of the swing arm 11 is supported by the pivot shaft 24 in an upwardly and downwardly swingable manner. The rear wheel 3 is rotatably supported on a rear end portion of the swing arm 11.

The upper cross member 21 is provided with suspension connecting stays 21a projecting rearwardly. The lower cross ember 22 is provided with link connecting stays 22a projecting rearwardly with a link mechanism 25 connected to the swing arm 11 being connected to the link connecting stays 22a. A tubular shock absorber unit 26 is disposed in a forwardly tilted state, with its upper end portion connected to the suspension connecting stays 21a and with its lower end portion connected to the link mechanism 25.

The front fork 10 is rotatably supported in a steerable manner on the head pipe 15 through a steering shaft (not shown). The front wheel 2 is rotatably supported on lower end portions of the front fork 10. A steering handle bar 27 is fixed to an upper end portion of the front fork 10.

A front stay 28 projecting in a forward direction is fixed to a front portion of the head pipe 15. A headlight 29, a plate-shaped windscreen 30 and meters 31 are supported by the front stay 28.

The fuel tank 40 includes a pair of left and right front-side tanks 41 disposed divisionally on left and right sides of the left and right main frames 16 with a rear-side tank 43 being provided inside the rear frame 14.

The seat 12 extends rearwardly in succession to rear portions of the front-side tanks 41, and is supported on an upper portion of the rear frame 14.

The motorcycle 1 has a resin-made body cover 32. The body cover 32 includes a pair of left and right shrouds 33 covering an upper portion of the front fork 10 and the down frames 18 on lateral sides of them; a tank cover 34 covering the front-side tanks 41 on the upper side of the latter; an under cover 35 covering the under frame 19 and a crankcase 52 of the engine 50 on the front and lower sides of them; and a pair of left and right fork covers 36 covering lower portions of the front fork 10.

A front fender 37 covering the front wheel 2 on the upper side of the latter is fixed to the front fork 10. A rear fender 38 covering the rear wheel 3 on the upper side of the latter is fixed to the rear frame 14 rearwardly of the seat 12.

A pair of left and right footrests 39 on which to put a rider's feet is provided at lower end portions of the pair of left and right pivot frames 17. A shift pedal 44 is provided at the front side of the footrest 39 on the left side.

The engine 50 is a water-cooled single-cylinder four-cycle engine, which is supported inside the cage-like front frame 13. A crankshaft (not shown) of the engine 50 is disposed to extend horizontally in the vehicle width direction. The engine 50 includes the crankcase 52 and a cylinder section 50a projecting upwardly from a front portion of the crankcase 52.

A transmission 57 is annexed to a rear portion of the engine 50. The transmission 57 has a structure in which an output shaft 59 projects to the left side from a rear portion of the crankcase 52, and a drive sprocket 63 is fixed to an end of the output shaft 59. An output of the engine 50 is transmitted to the rear wheel 3 through a drive chain 65 arranged between and around the drive sprocket 63 and a driven sprocket 64 provided to be integral with the rear wheel 3. The drive sprocket 63 is covered with a sprocket cover (not shown).

An exhaust pipe 66 of the engine 50 extends toward a front lower side from a front surface of the cylinder section 50a (more specifically, a cylinder head (not shown)), is then led out toward a right-hand side, extends rearwardly along the under frame 19, and is connected to a muffler 67 disposed on the right side of the rear wheel 3. The muffler 67 is supported on the rear frame 14.

A pair of left and right plate-shaped radiators 68 in which cooling water for the engine 50 is circulated is provided (in a left-right pair) between the down frame 18 and the left and right shrouds 33.

The front-side tanks 41 are sized so as to extend between the left and right shrouds 33 and the rear frame 14, to extend downward from laterally outer sides of the left and right main frames 16, and to cover an area ranging to lateral sides of the cylinder section 50a and a front portion of the crankcase 52.

An air cleaner 71 constituting an intake system of the engine 50 is provided rearwardly of and continuously with the front-side tanks 41, and is located over the shock absorber unit 26.

At a lower portion of the rear frame 14, a mud guard 80 is provided which extends downward to the front side of the rear wheel 3.

Figure 2:
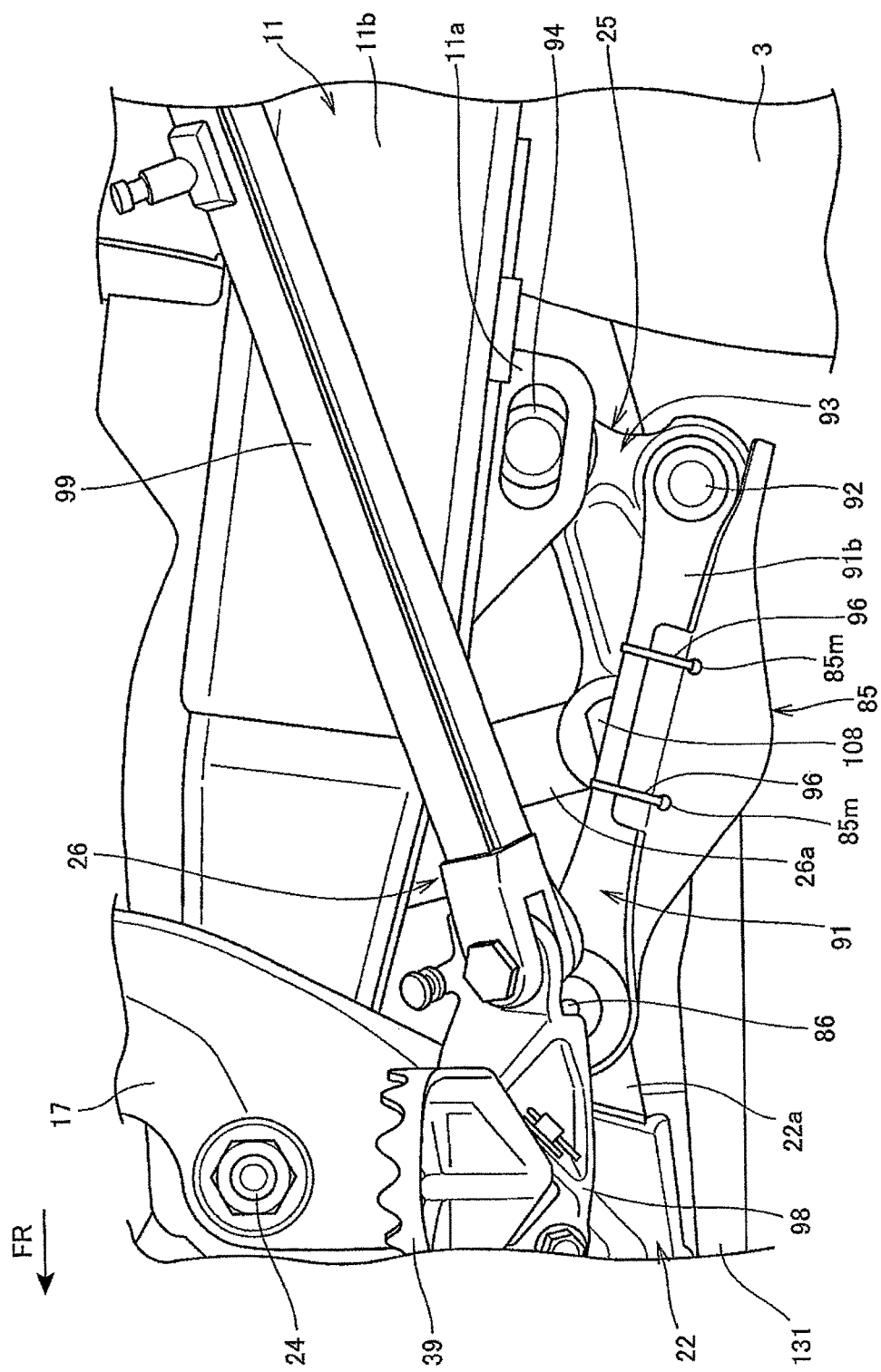
FIG. 2 is a major part side view of a vehicle body showing a link guard covering the lower side of a link mechanism and the surroundings of the link guard.

FIG. 2 is a major part side view showing a link guard 85 covering the lower side of the link mechanism 25 and the surroundings of the link guard 85. FIG. 2 illustrates a 1G condition where a driver is riding on the vehicle.

The link mechanism 25 includes a shock absorber rod 91 having a front end portion connected to the link connecting stay 22a of the lower cross member 22 through a connecting bolt 86 in a swingable manner and a shock absorber arm 93 having a rear lower end portion connected to the other end portion of the shock absorber rod 91 through a connecting bolt 92 in a swingable manner.

The shock absorber rod 91 is disposed at a rearwardly downward gradient. The link guard 85 covers the shock absorber rod 91 in a range from a front end portion to a rear end portion of the shock absorber rod 91 on the lower side of the shock absorber rod 91.

The shock absorber arm 93 has a front end portion connected to a lower end portion 26a of the shock absorber unit 26 in a swingable manner with a rear upper end portion being connected to an arm projecting portion 11a, which projects downwardly from a lower portion of the swing arm 11 integrally with the latter, through a connecting bolt 94 in a swingable manner.

The link guard 85 is made of resin or made of a light metal such as an aluminum alloy, and is fixed to the shock absorber rod 91 of the link mechanism 25 by a plurality of binding bands 96.

The binding bands 96 are resin-made string-like members, which are passed respectively through a plurality of passing holes 85m bored in the link guard 85 and are wound around a pair of left and right rod portions 91b provided as parts of the shock absorber rod 91. Both end portions of each of the binding bands 96 are tied with each other. A string, a wire, a metallic belt or the like may be used as the string-like member, in place of the binding band 96.

A stand bracket 98 is fixed to a lower portion of the pivot frame 17 on the left side with a side stand 99 being mounted to the stand bracket 98 so that it can be erected or retracted (stored).

Figure 3:
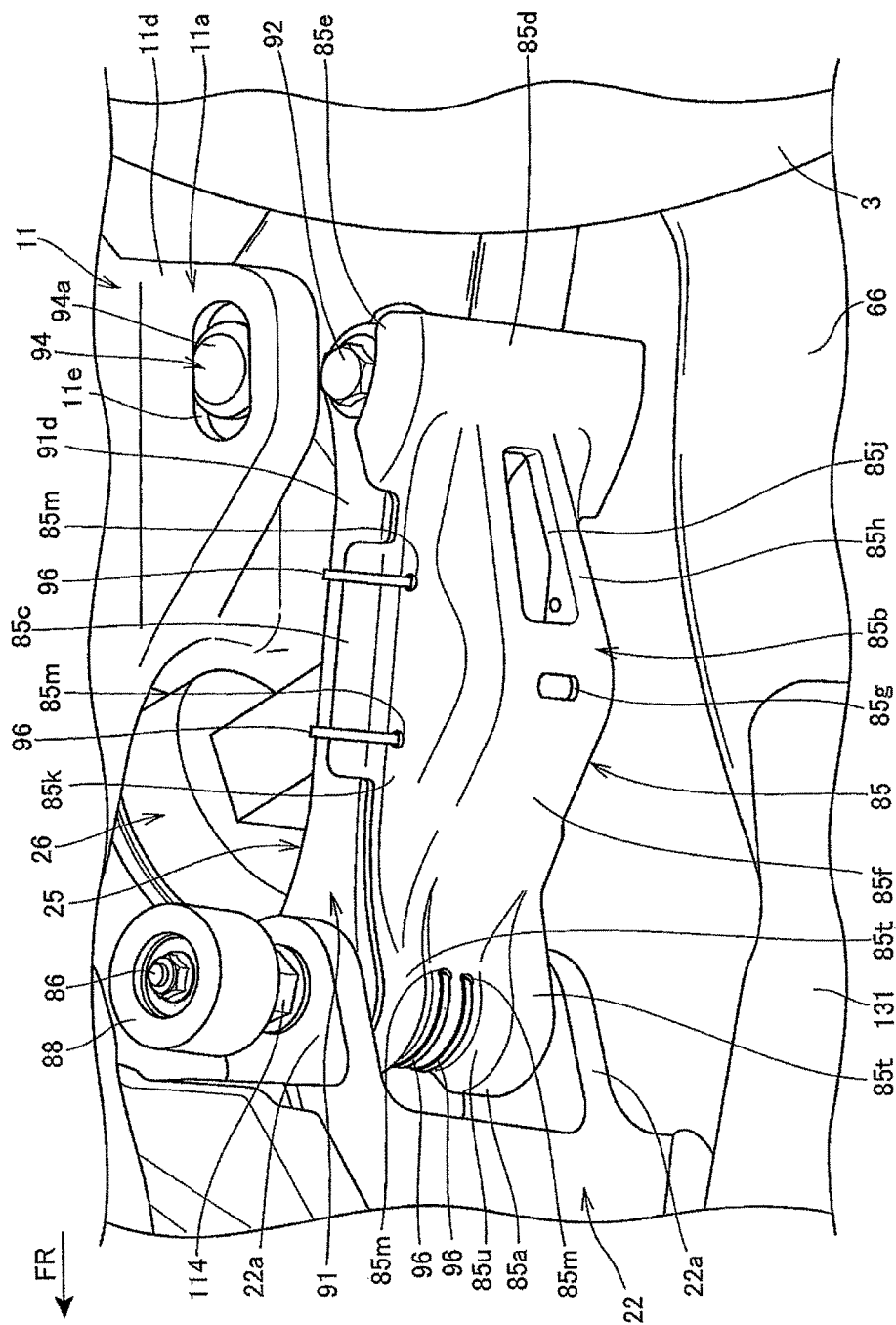
FIG. 3 is a perspective view showing the link guard and the surroundings thereof.

FIG. 3 is a perspective view showing the link guard 85 and the surroundings thereof.

The link guard 85 integrally includes a front end guard portion 85a, a mountain-shaped guard portion 85b, a pair of left and right intermediate extension guard portions 85c, a rear end guard portion 85d, and a pair of left and right rear end extension guard portions 85e.

The front end guard portion 85a is formed so as to enfold a front end portion of the shock absorber rod 91 of the link mechanism 25, and is provided in its lower portion with a pair of left and right passing holes 85m through which to pass a pair of left and right binding bands 96. The front end guard portion 85a is fixed to the front end portion of the shock absorber rod 91 by the binding bands 96 passed through the passing holes 85m.

The mountain-shaped guard portion 85b is provided at the rear of the front end guard portion 85a, and projects downwardly in a mountain shape. The mountain-shaped guard portion 85b includes a forwardly ascending (rearwardly descending) slide surface portion 85f and a rearwardly ascending slant surface 85h which constitute a bottom surface thereof, and a pair of left and right side walls 85k substantially triangular in shape. A water drain hole 85g for draining water therethrough is bored in a portion near the summit of the mountain at the rear of the slide surface portion 85f, and a mud-discharging hole 85j for discharging mud, sand and the like accumulated inside the mountain-shaped guard portion 85b is bored in the slant surface 85h rearwardly of the water drain hole 85g. The pair of left and right side walls 85k are each provided with a plurality of passing holes 85m through which to pass binding bands 96.

The intermediate extension guard portion 85c is formed to extend sideways and upwardly from longitudinal-vehicle-directionally middle portions of upper edge portions of the left and right side walls 85k so as to partly cover side surfaces 91d of the shock absorber rod 91, and is bound to the rod portion 91b by two binding bands 96. The rear end guard portion 85d is formed to be wider than the mountain-shaped guard portion 85b in vehicle width direction with a rear end extending into the vicinity of the rear end of the rod portion 91b. The rear end extension guard portions 85e extend upwardly from the rear end guard portion 85d to positions immediately under the connecting bolt 92.

The arm projecting portion 11a of the swing arm 11 is provided in its side surface 11d with a slot-shaped recess 11e formed to be elongated in the longitudinal vehicle direction with a bolt passing hole (not shown) through which to pass the connecting bolt 94 being bored in a bottom portion of the slot-shaped recess 11e. The connecting bolt 94 has a head portion 94a formed with two parallel surfaces. The two parallel surfaces fit to a pair of flat surface-shaped opposed side walls of the slot-shaped recess 11e, so that the connecting bolt 94 can be prevented by the slot-shaped recess 11e from rotating.

Figure 4:
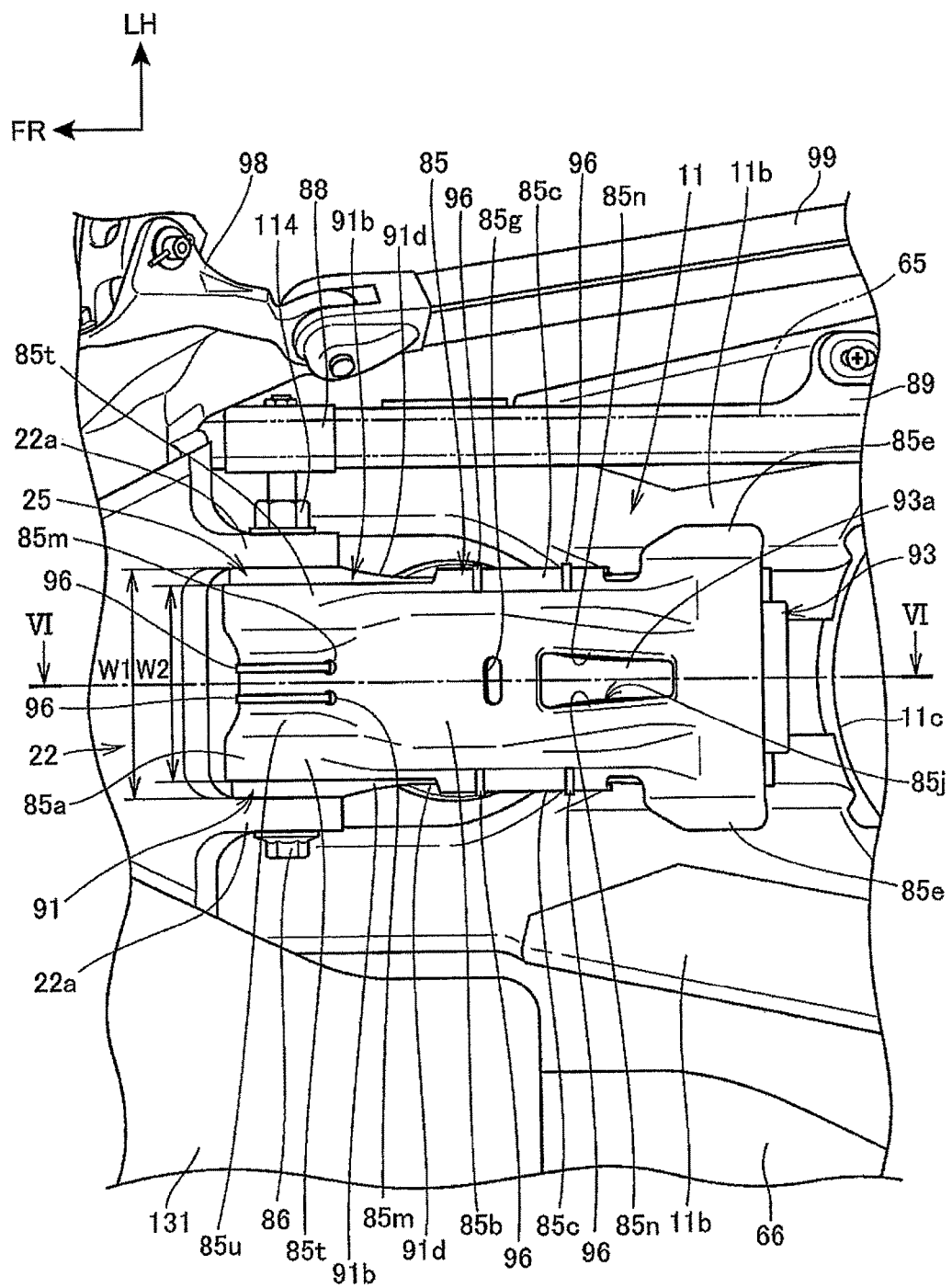
FIG. 4 is a bottom view showing the link guard and the surroundings thereof.
Figure 5:
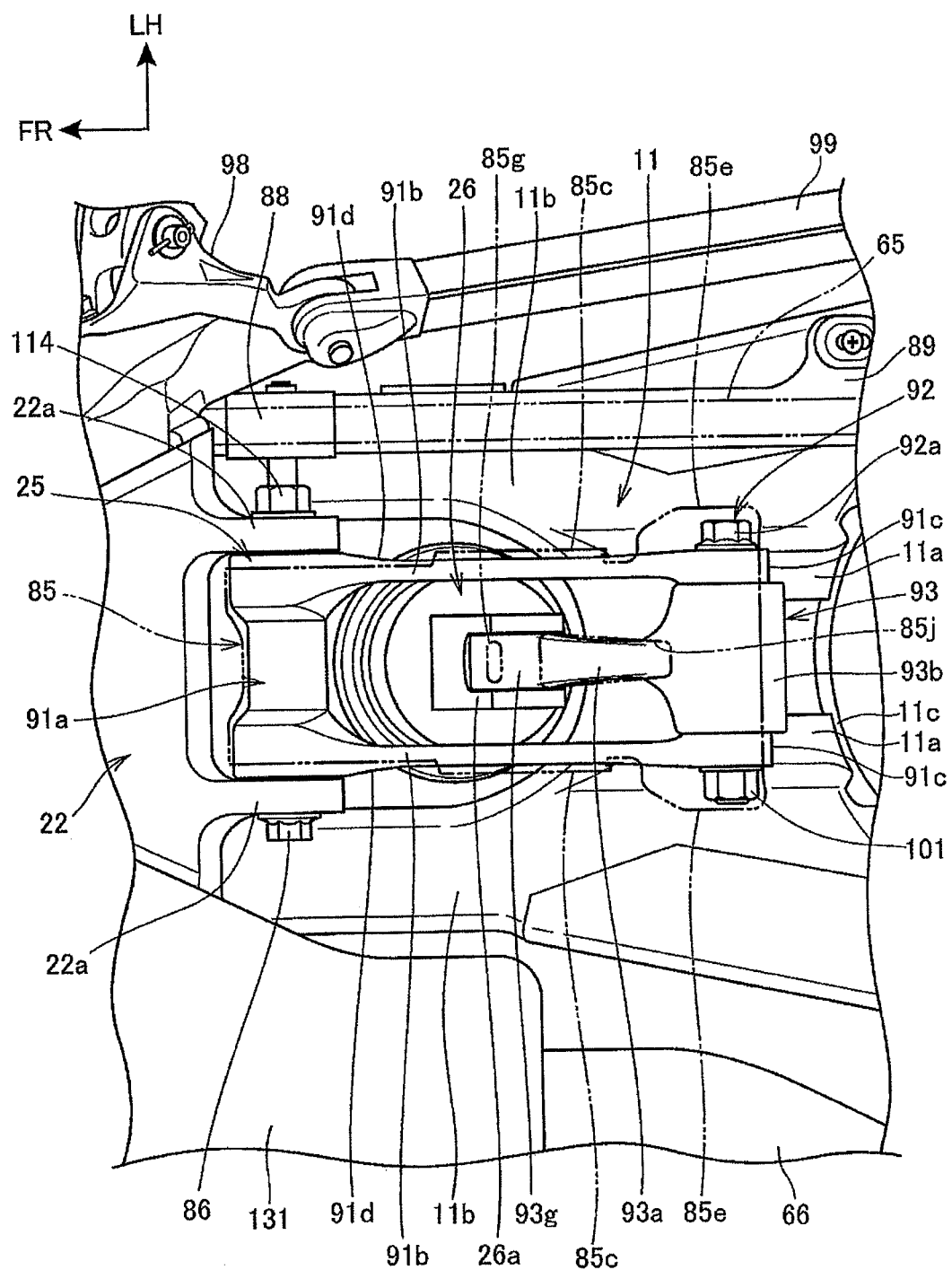
FIG. 5 is a bottom view showing a link mechanism over the link guard and the surroundings of the link mechanism.

FIG. 4 is a bottom view showing the link guard 85 and the surroundings thereof. FIG. 5 is a bottom view showing the link mechanism 25 over the link guard 85 and the surroundings of the link mechanism 25.

As shown in FIGS. 4 and 5, the shock absorber rod 91 of the link mechanism 25 includes a tubular bearing portion 91a located between the left and right link connecting stays 22a of the lower cross member 22, and the pair of left and right rod portions 91b which extend rearwardly integrally from left and right ends of the bearing portion 91a and which are substantially parallel to each other. The shock absorber arm 93 of the link mechanism 25 integrally includes a small-width front arm portion 93a extending rearwardly with its front end portion connected to the lower end portion 26a of the shock absorber unit 26 and a rear lower end bearing portion 93b which is a large-width portion provided at a rear end portion of the front arm portion 93a and which is connected to rear end portions 91c of the rod portions 91b of the shock absorber rod 91. The front arm portion 93a is provided with a front end bearing portion 93g.

The link guard 85 has the front end guard portion 85a so formed that its width W2 in the vehicle width direction is smaller than the width W1 in the vehicle width direction of the bearing portion 91a of the shock absorber rod 91. The width W2 is thus set to be smaller than the width W1 for preventing the link guard 85 from interfering with the left and right link connecting stays 22a due to production-dependent dimensional variations as to the width W2 of the link guard 85 or the mounted conditions of the link guard 85 onto the shock absorber rod 91.

The mud-discharging hole 85j is so formed that its left and right edge portions 85n substantially overlap with side ends of the front arm portion 93a of the shock absorber arm 93 in bottom view. This ensures that a discharge amount of mud or the like via the mud-discharging hole 85j is secured, and that mud or the like is unlikely to enter into the inside of the link guard 85 from below through the mud-discharging hole 85j.

The left and right intermediate extension guard portions 85c are so disposed as to be proximate to or in contact with the side surfaces 91d of the rod portions 91b of the shock absorber rod 91. Positional deviations of the link guard 85 in the vehicle width direction are inhibited by the left and right intermediate extension guard portions 85c.

The left and right rear end extension guard portions 85e cover, from below, a head portion 92a of the connecting bolt 92 and a nut 101 screw-engaged with a tip portion of the connecting bolt 92, respectively. This ensures that the connecting bolt 92 and the nut 101 can be protected from flying stones and the like by the rear end extension guard portions 85e.

The swing arm 11 integrally includes a pair of left and right arm main bodies 11b extending in the longitudinal vehicle direction and an arm connecting portion 11c extending in the vehicle width direction so as to interconnect the left and right arm main bodies 11b. The arm connecting portion 11c is integrally provided with the pair of left and right arm projecting portions 11a which project downwardly.

The rear end portions 91c of the rod portions 91b of the shock absorber rod 91, the rear lower end bearing portion 93b of the shock absorber arm 93, the connecting bolt 92, the nut 101, and the left and right rear end extension guard portions 85e of the link guard 85, are located under the arm connecting portion 11c of the swing arm 11.

A resin-made chain roller 88 is rotatably supported on the connecting bolt 86 so as to restrain the drive chain 65 from being shaken or vibrated. A resin-made chain guard 89 is fixed to a lower surface of the arm main body 11b of the swing arm 11 so as to prevent the drive chain 65 from interfering with the swing arm 11.

Figure 6:
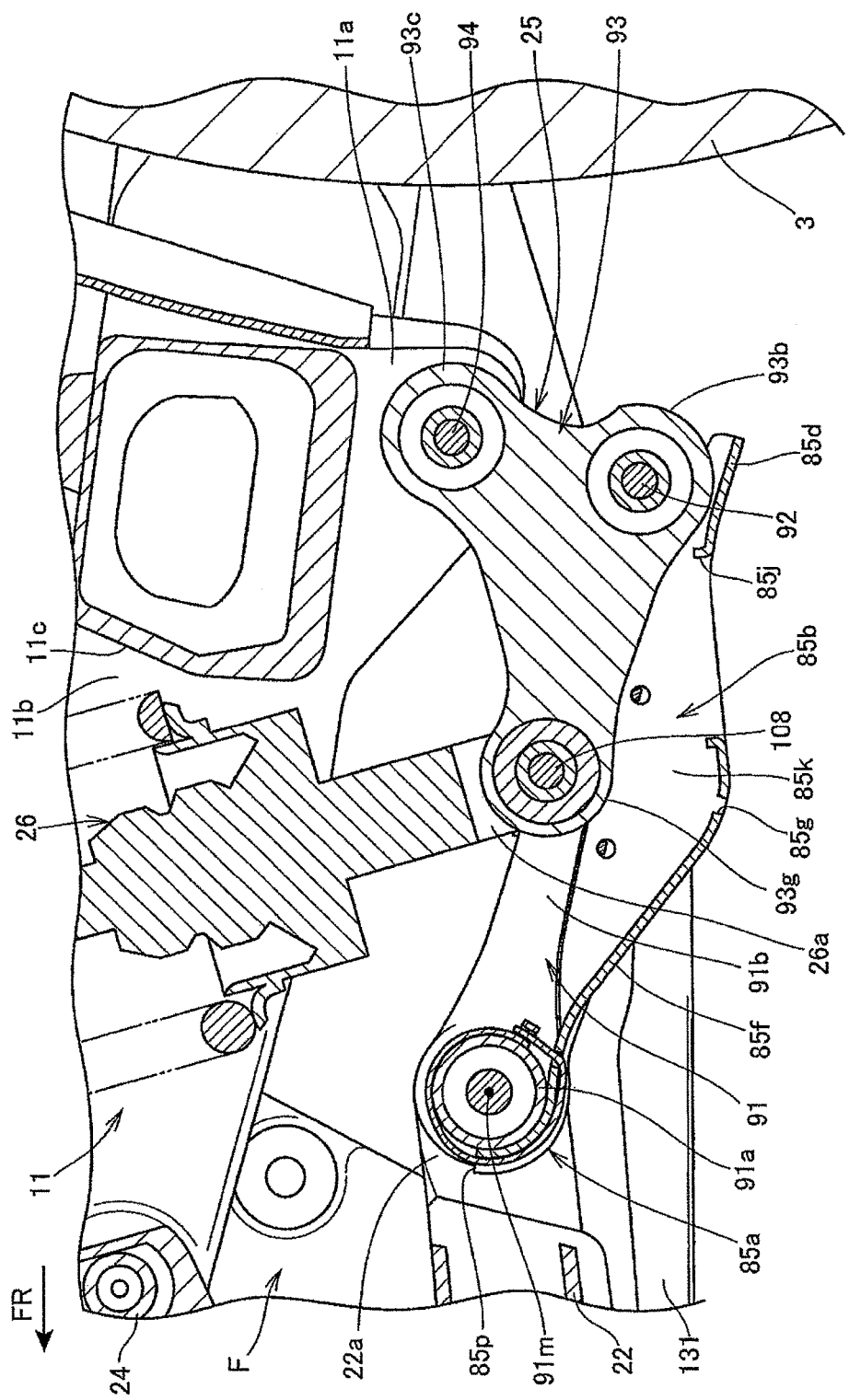
FIG. 6 is a sectional view taken along line VI-VI of FIG. 4.
Figure 7:
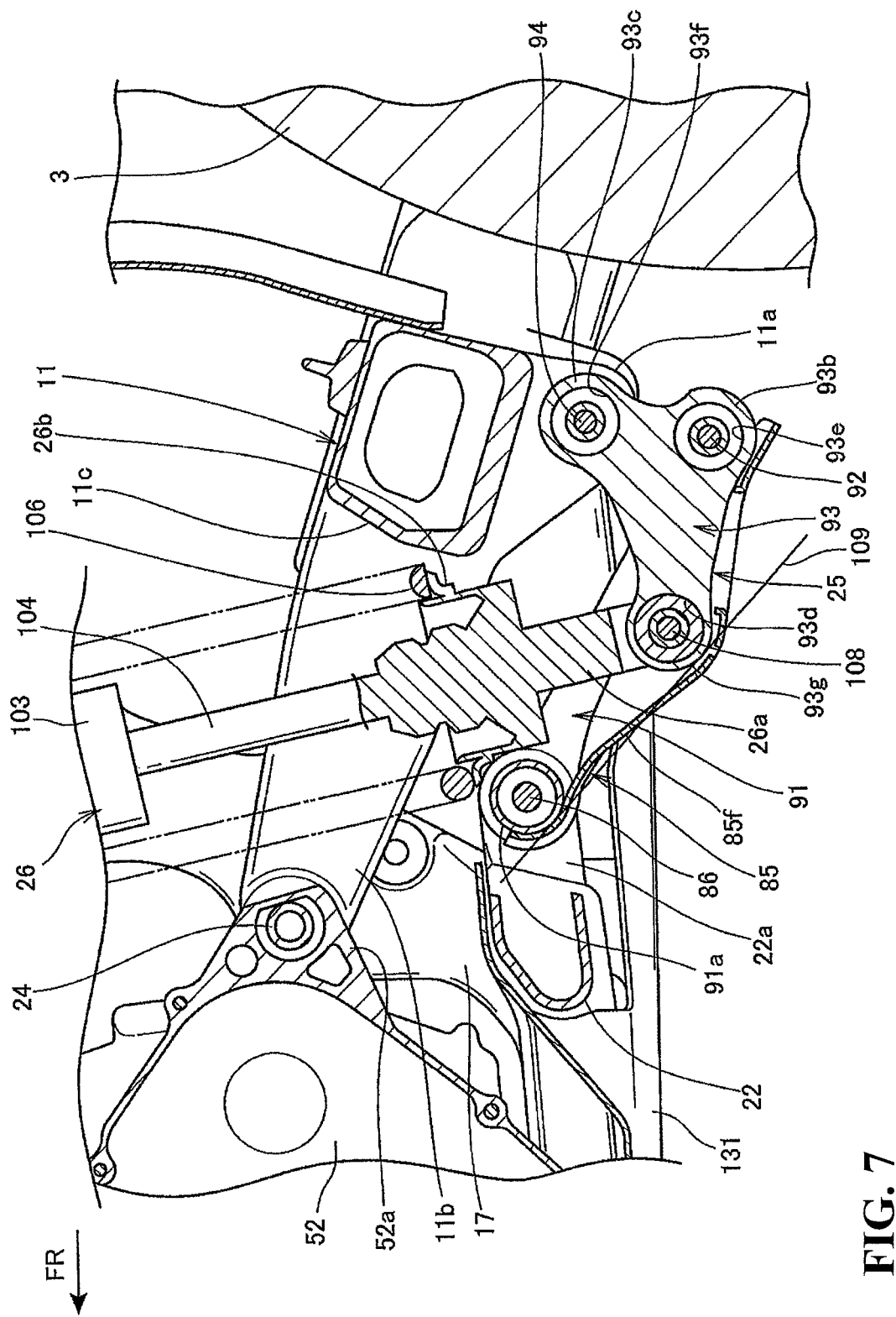
FIG. 7 is a sectional view showing the link mechanism, the link guard and the surroundings of them.

FIG. 6 is a sectional view taken along line VI-VI of FIG. 4. FIG. 7 is a sectional view showing the link mechanism 25, the link guard 85 and the surroundings of them, and, like FIG. 6, it shows a section along line VI-VI of FIG. 4.

FIG. 6 illustrates the shock absorber unit 26 in a 1G condition where a driver is riding on the vehicle, and FIG. 7 depicts a fully stretched condition where the shock absorber unit 26 is stretched most.

As shown in FIG. 6, the front end bearing portion 93g of the shock absorber arm 93 of the link mechanism 25 overlaps with the rod portion 91b of the shock absorber rod 91 in side view.

The link guard 85 has its front end guard portion 85a extending in an arcuate shape along a peripheral surface of the bearing portion 91a of the shock absorber rod 91, and its front end surface 85p is located above an axis 91m (indicated by a solid circle or dot) of the bearing portion 91a. Thus, the front end guard portion 85a is formed in such a shape so as to enfold the bearing portion 91a, whereby the front end guard portion 85a can be prevented from coming off (turning over) to the lower side even when something collides against the front end guard portion 85a.

In addition, since the slide surface portion 85f is formed at a forwardly upward gradient, even when a rock, a stump or the like collides against the slide surface portion 85f, the link mechanism 25 can be protected while mitigating the shock of collision. In addition, since the mountain-shaped guard portion 85b having the left and right side walls 85k is formed, rigidity can be enhanced, so that deformation of the link guard 85 can be restrained.

The rear end guard portion 85d extends in the longitudinal direction (substantially the longitudinal vehicle direction) so as to be able to cope with differences in the length of the shock absorber rod 91, in other words, so as to be able to cover the whole body of the shock absorber rod 91 and the shock absorber arm 93 on the lower side of them.

As depicted in FIG. 7, the shock absorber unit 26 includes a cylinder 103, a piston rod 104, the lower end portion 26a, and a shock absorber spring 106.

A piston (not shown) is inserted in the cylinder 103 in a movable manner, and the piston rod 104 is provided to extend from the piston to the outside of the cylinder 103. The lower end portion 26a is provided at a lower end portion of the piston rod 104. The shock absorber spring 106 is provided in a compressed state between a spring upper end support portion provided at an upper end portion of the cylinder 103 and a spring lower end support portion 26b provided at the lower end portion 26a.

The shock absorber unit 26 extends to penetrate a space surrounded by the left and right arm main bodies 11b and the arm connecting portion 11c of the swing arm 11, on the rear side of the pivot shaft 24.

The shock absorber arm 93 of the link mechanism 25 is a component part which is roughly triangular in shape in side view. The front end bearing portion 93g, the rear lower end bearing portion 93b, and the rear upper end bearing portion 93c are provided respectively at the three vertices of the triangle. The front end bearing portion 93g, the rear lower end bearing portion 93b, and the rear upper end bearing portion 93c are provided with penetration holes 93d, 93e, and 93f, respectively.

A connecting bolt 108 connected to the shock absorber unit 26 is passed through the penetration hole 93d, the connecting bolt 92 connected to the shock absorber rod 91 is passed through the penetration hole 93e, and the connecting bolt 94 connected to the swing arm 11 is passed through the penetration hole 93f.

The pivot shaft 24 is supported by the left and right pivot frames 17. In addition, a fixing portion 52a provided integrally at a rear end portion of the crankcase 52 is supported on the left and right pivot frames 17 by way of the pivot shaft 24.

The slide surface portion 85f of the link guard 85 extends at a forwardly upward gradient substantially along a straight line 109 which touches both the bearing portion 91a at the front end of the shock absorber rod 91 and the front end bearing portion 93g of the shock absorber arm 93 in side view.

Figure 8:
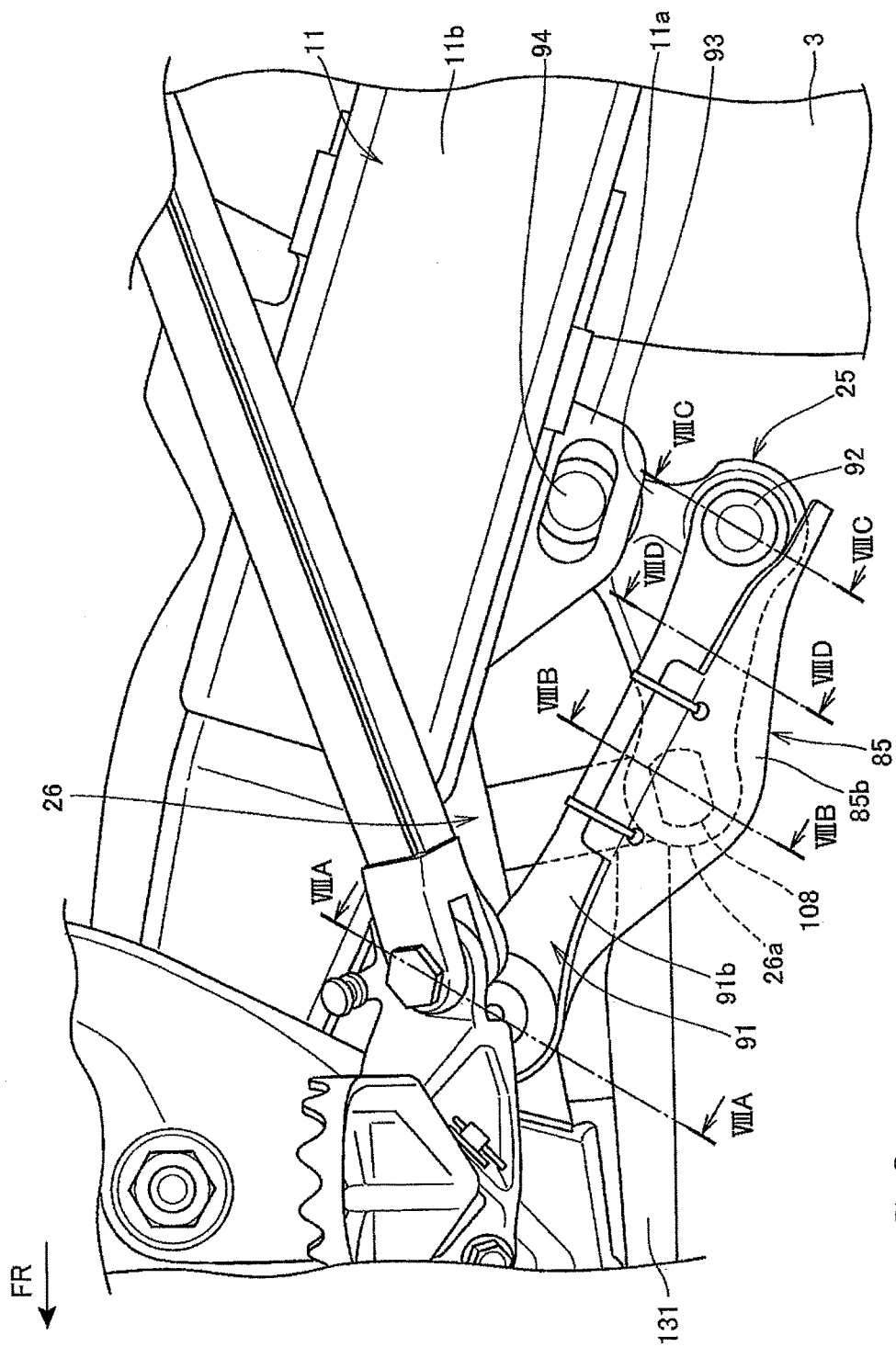
FIG. 8 is a side view showing the link mechanism, the link guard and the surroundings of them, with a shock absorber unit being in a fully stretched state in which it is stretched most.

FIG. 8 is a side view showing the link mechanism 25, the link guard 85 and the surroundings of them in a fully stretched condition where the shock absorber unit 26 is stretched most.

The lower end portion 26a of the shock absorber unit 26, specifically, the connecting bolt 108 penetrating the lower end portion 26a, is located below the rod portion 91b of the shock absorber rod 91 of the link mechanism 25. In this instance, the lower end portion 26a of the shock absorber unit 26 and the shock absorber arm 93 are located proximate to a portion near the summit of the mountain-shaped guard portion 85b of the link guard 85. In such a proximately located condition, mud and the like accumulated in the inside of the mountain-shaped guard portion 85b can be discharged through the mud-discharging hole 85j (see FIG. 6).

Figure 9:
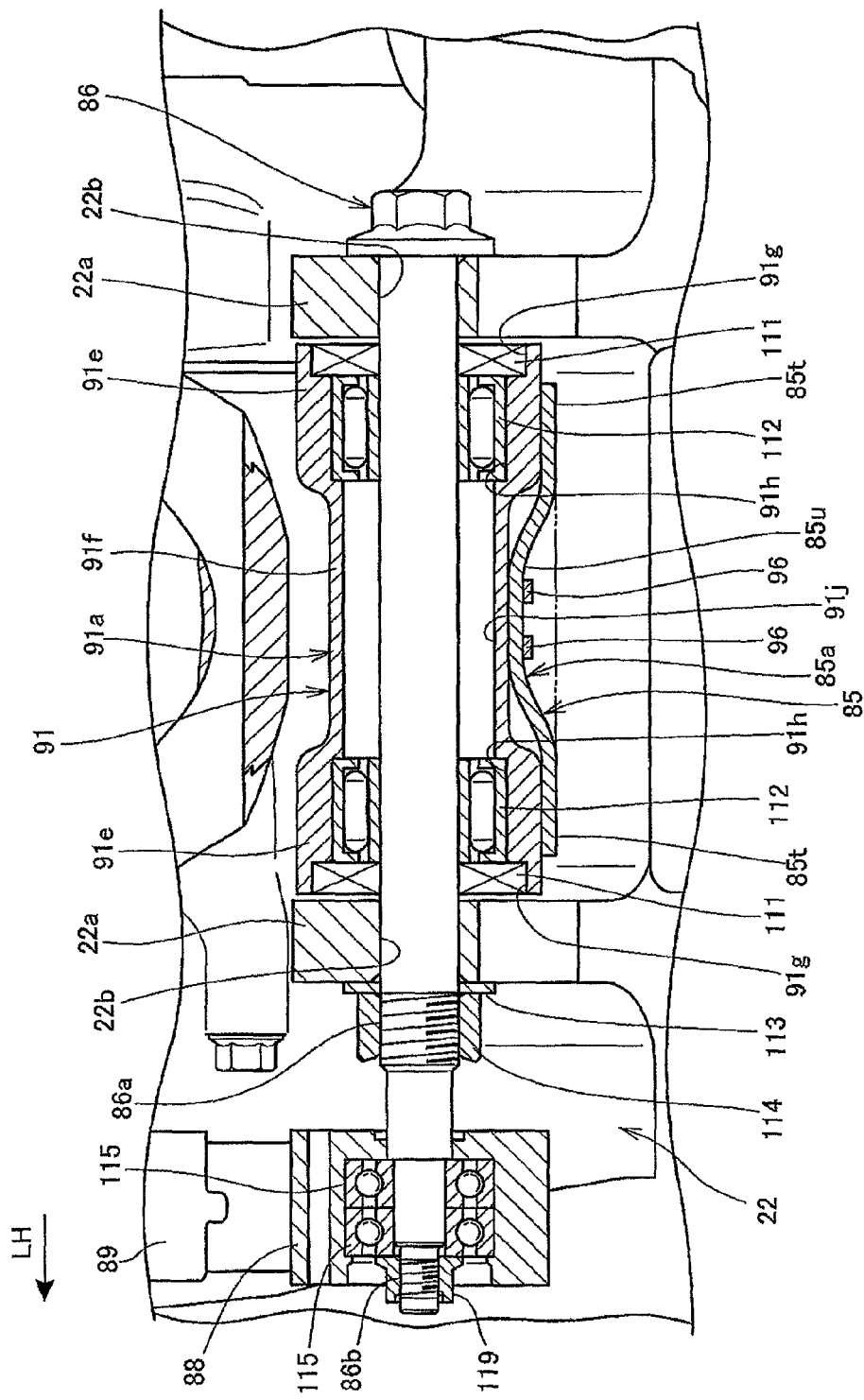
FIG. 9 is a sectional view taken along line VIIIA-VIIIA of FIG. 8.
Figure 10:
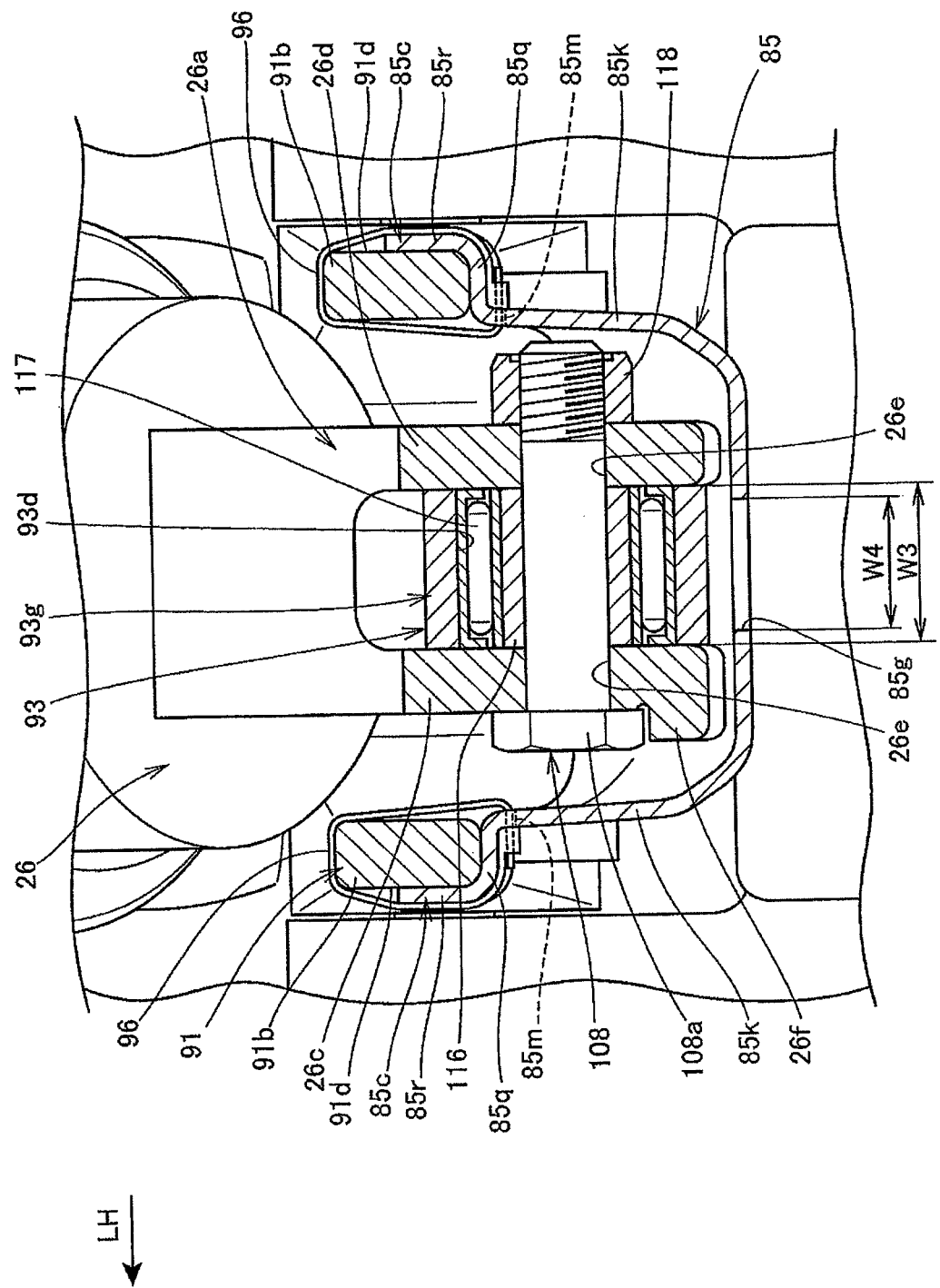
FIG. 10 is a sectional view taken along line VIIIB-VIIIB of FIG. 8.
Figure 11:
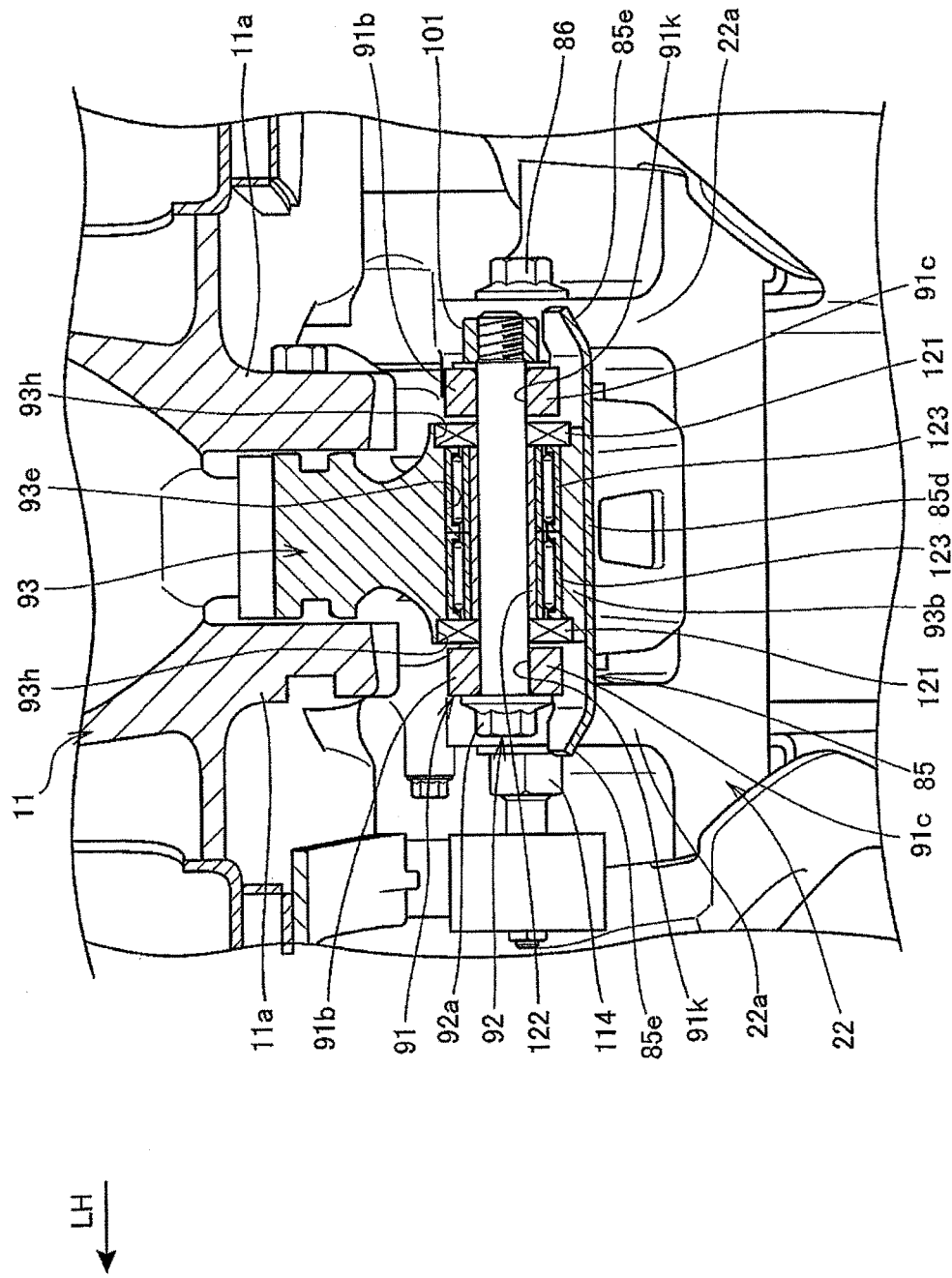
FIG. 11 is a sectional view taken along line VIIIC-VIIIC of FIG. 8.
Figure 12:
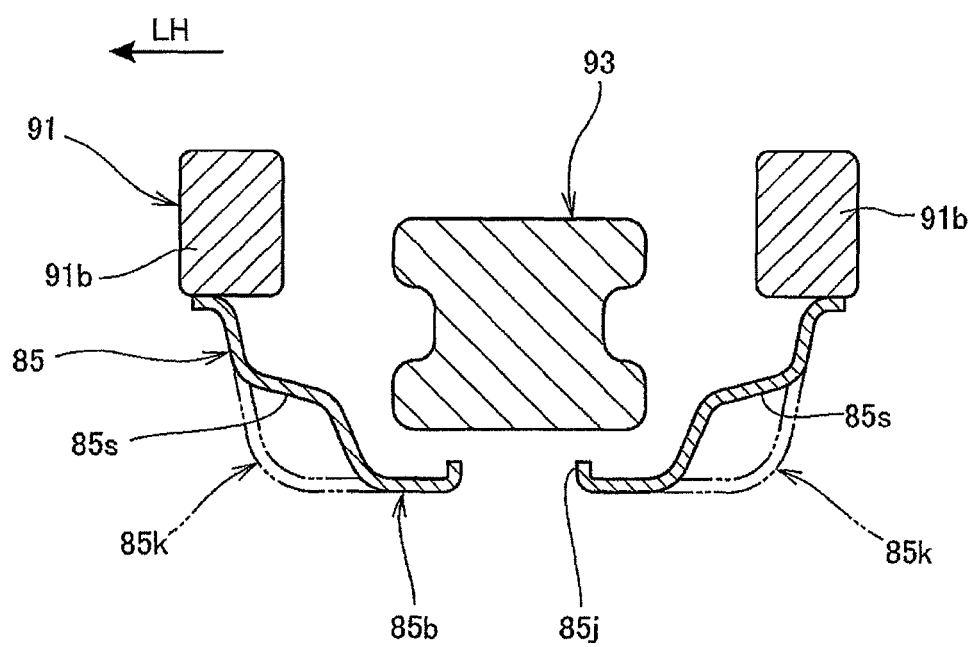
FIG. 12 is a sectional view taken along line VIIID-VIIID of FIG. 8.

FIG. 9 is a sectional view taken along line of FIG. 8. FIG. 10 is a sectional view taken along line VIIIB-VIIIB of FIG. 8. FIG. 11 is a sectional view taken along line VIIIC-VIIIC of FIG. 8. FIG. 12 is a sectional view taken alone line VIIID-VIIID of FIG. 8.

As illustrated in FIG. 9, the bearing portion 91a of the shock absorber rod 91 is disposed between the left and right link connecting stays 22a. The bearing portion 91a includes large-diameter portions 91e provided at both ends thereof, and a small-diameter portion 91f provided integrally between the left and right large-diameter portions 91e and smaller than the large-diameter portions 91e in outside diameter.

The large-diameter portions 91e are each formed therein with a large-diameter hole 91g which is provided on the end face side and in which an oil seal 111 is fitted, and a small-diameter hole 91h which is formed on the vehicle-width-directionally inner side of the large-diameter hole 91g and in which a needle bearing 112 is inserted. A penetration hole 91j is provided between the left and right small-diameter holes 91h.

Bolt passing holes 22b are bored respectively in the left and right link connecting stays 22a. The connecting bolt 86 is passed sequentially through the bolt passing hole 22b in the link connecting stay 22a on the right side, the oil seal 111 on the right side, the needle bearing 112 on the right side, the penetration hole 91j, the needle bearing 112 on the left side, the oil seal 111 on the left side, and the bolt passing hole 22b in the link connecting stay 22a on the left side. Then, the connecting bolt 86 is passed through a washer 113, and a nut 114 is screw-engaged with a male screw 86a provided on the connecting bolt 86. In addition, the chain roller 88 is rotatably mounted to a left-side end portion of the connecting bolt 86 through a pair of ball bearings 115, and a nut 119 is screw-engaged with a male screw 86b formed at a tip portion of the connecting bolt 86, whereby the ball bearings 115 are fixed to the connecting bolt 86.

The front end guard portion 85a of the link guard 85 integrally includes side portions 85t formed to be along the left and right large-diameter portions 91e of the shock absorber rod 91 and a central recessed portion 85u formed between the left and right side portions 85t so as to be recessed into the inside of the small-diameter portion 91f of the shock absorber rod 91. With the recessed portion 85u thus formed to be recessed relative to the side portions 85t, the front end guard portion 85a can be positioned in the vehicle width direction relative to the bearing portion 91a of the shock absorber rod 91. In addition, with the front end guard portion 85a thus bent in sectional shape, the front end guard portion 85a can be enhanced in rigidity (surface rigidity). In addition, when the binding bands 96 (see FIG. 4) are disposed inside the recessed portion 85u, the binding bands 96 can be passed through a place higher as compared with the minimum road clearance in the section of the recessed portion 85u, so that the possibility of breakage of the binding bands 96 can be lowered.

As shown in FIG. 10, the lower end portion 26a of the shock absorber unit 26 is bifurcated to be formed with left and right connecting pieces 26c and 26d. The connecting pieces 26c and 26d respectively have bolt passing holes 26e bored therein. The connecting piece 26c on the left side is integrally formed with an anti-rotating portion 26f which engages with a head portion 108a of the connecting bolt 108 to thereby exhibit an anti-rotating effect. A collar 116 is disposed between the left and right connecting pieces 26c and 26d.

A needle bearing 117 is disposed between the penetration hole 93d in the shock absorber arm 93 and the collar 116.

The connecting bolt 108 is passed sequentially through the bolt passing hole 26e in the connecting piece 26c, the collar 116, and the bolt passing hole 26e in the connecting piece 26d. A nut 118 is screw-engaged with a tip portion of the connecting bolt 108.

Each of the left and right intermediate extension guard portions 85c of the link guard 85 is formed in an L-shape, and covers each of the rod portions 91b of the left and right shock absorber rods 91 on the lower side and a laterally outer side of the rod portion 91b. The intermediate extension guard portion 85c includes a horizontal portion 85q which is substantially horizontal and covers the lower side of the rod portion 91b, and a vertical portion 85r which is substantially vertical and covers the laterally outer side of the rod portion 91b.

The horizontal portion 85q is located proximate to or in contact with a lower surface 91n of the rod portion 91b, and is therefore able to position the link guard 85 in the vertical direction relative to the shock absorber rod 91. In addition, the vertical portion 85r is located proximate to or in contact with a side surface 91d of the rod portion 91b, and is therefore able to position the link guard 85 in the vehicle width direction relative to the shock absorber rod 91.

With the intermediate extension guard portion 85c thus formed in the L-shape, the link guard 85 can be stably fixed to the shock absorber rod 91.

Let W3 be the width in the vehicle width direction of the front end bearing portion 93g of the shock absorber arm 93 and let W4 be the width of the water drain hole 85g in the vehicle width direction, then the width W4 of the water drain hole 85g is smaller than the width W3 of the front end bearing portion 93g. This makes it possible to ensure that muddy water or the like is unlikely to enter from below the water drain hole 85g into a gap between the left and right connecting pieces 26c and 26d and the front end bearing portion 93g; thus, muddy water and the like can be restrained from reaching the needle bearing 117, and the needle bearing 117 can be protected.

As shown in FIG. 11, rear end portions of the left and right shock absorber rods 91 respectively have bolt passing holes 91k bored therein.

The rear lower end bearing portion 93b of the shock absorber arm 93 has large-diameter holes 93h formed on both end sides thereof, and a penetration hole 93e bored between the left and right large-diameter holes 93h. An oil seal 121 is fitted in each large-diameter hole 93h, and a collar 122 is disposed between the left and right oil seals 121. Two needle bearings 123 are disposed between the penetration hole 93e in the shock absorber arm 93 and the collar 122.

The connecting bolt 92 is passed sequentially through the bolt passing hole 91k in the shock absorber rod 91 on the left side, the oil seal 121 on the left side, the collar 122, the oil seal 121 on the right side, and the bolt passing hole 91k in the shock absorber rod 91 on the right side. A nut 124 is screw-engaged with a tip portion of the connection bolt 92.

The left and right rear end extension guard portions 85e of the link guard 85 are inclined to gradually become higher in a vehicle-width-directionally outward direction from left and right edge portions of the rear end guard portion 85d formed to be substantially horizontal, and cover the head portion 92a of the connecting bolt 92 and the nut 101 on the lower side thereof.

As shown in FIG. 12, the mountain-shaped guard portion 85 of the link guard 85 has its side walls 85k formed with stepped portions 85s which are substantially horizontal. The stepped portions 85s are formed over the whole longitudinal (longitudinal-vehicle-directional) range of the mountain-shaped guard portion 85b exclusive of the area near the summit of the mountain-shaped guard portion 85b.

With the side wall 85k thus formed with the stepped portion 85s, the side wall 85k of the mountain-shaped guard portion 85b can be further formed with a vertical wall and a horizontal wall, whereby the rigidity of the mountain-shaped guard portion 85b can be further enhanced. In addition, with the stepped portions 85s thus formed, the volume of the inside of the link guard 85 can be reduced, whereby the amount of mud and the like accumulated inside the link guard 85 can be reduced.

Figure 13:
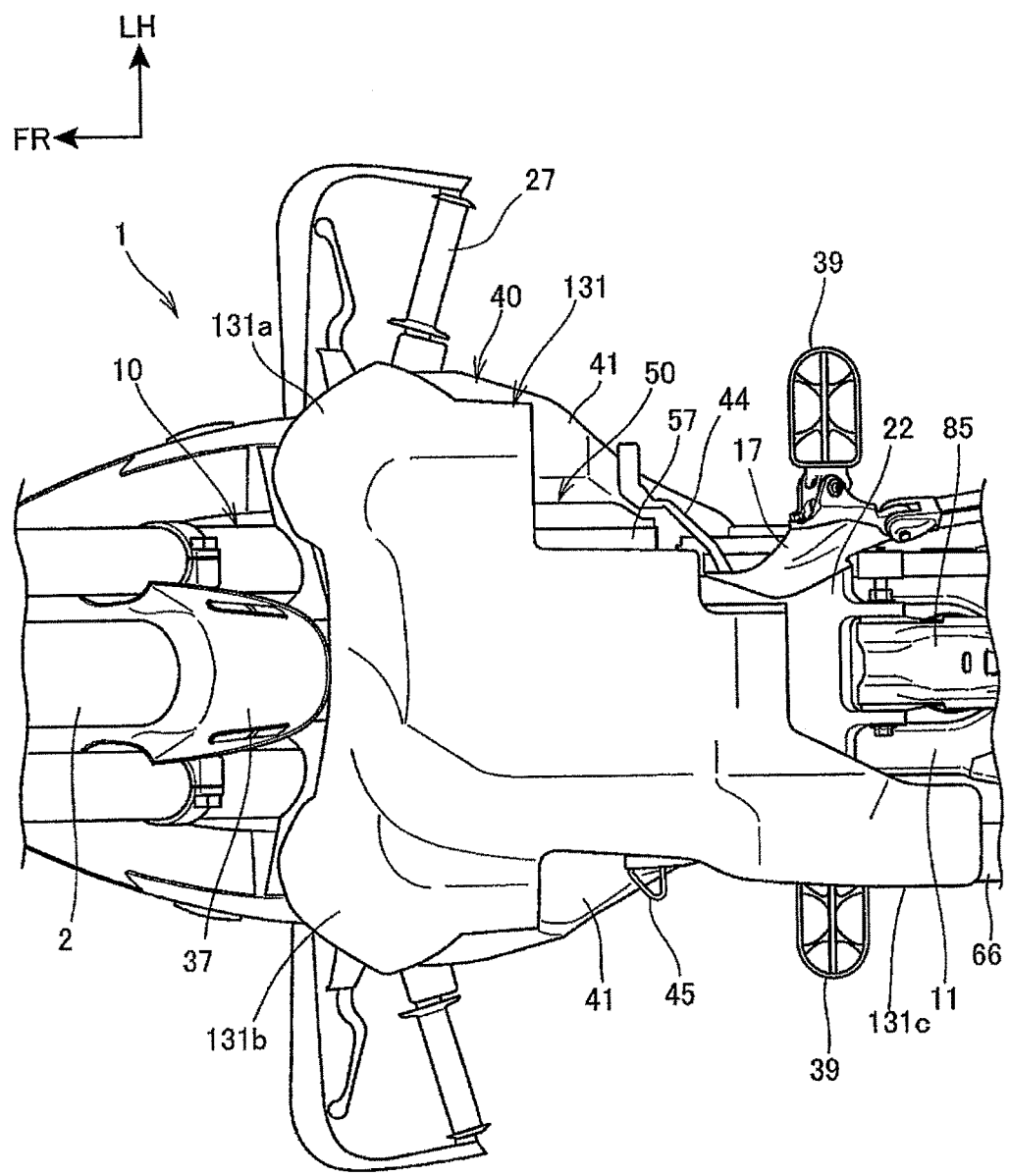
FIG. 13 is a major part bottom view showing a bottom portion of the motorcycle.

FIG. 13 is a major part bottom view showing a bottom portion of the motorcycle 1.

A lower portion of a vehicle body front portion of the motorcycle 1 is covered with, and protected by, a plate-shaped skid guard 131 from below. The skid guard 131 is provided with a left protruding portion 131a protruding leftward and forward and a right protruding portion 131b protruding rightward and forward, so as to cover the left and right front-side tanks 41.

Left end portions of the engine 50 and the transmission 57, the pivot frame 17 on the left side, and a central to left-side portion of the lower cross member 22 are not covered with the skid guard 131.

A rearward extension portion 131c is provided to extend rearward integrally from a right rear portion of the skid guard 131. A right end portion of the lower cross member 22, an exhaust pipe 66 and the like are covered with the rearward extension portion 131c from below. A brake pedal 45 is provided.

As has been illustrated in FIGS. 1, 5 and 7, there is provided the link mechanism protection structure for the motorcycle 1 as a saddle type vehicle. The motorcycle 1 includes the body frame F; the swing arm 11 having a front end portion pivotally supported in an upwardly and downwardly swingable manner on the pivot shaft 24 disposed at a lower portion of the body frame F, the swing arm 11 adapted to support the rear wheel 3 in a rotatable manner on a rear end portion thereof with the shock absorber unit 26 adapted to restrict the amount of swinging of the swing arm 11 relative to the body frame F. The shock absorber unit 26 has an upper end portion connected to the body frame F and the link mechanism 25 connected to a lower end portion of the shock absorber unit 26, to the swing arm 11 and to the body frame F, with the link guard 85 being disposed under the link mechanism 25. In the link mechanism protection structure, as shown in the figures, the link mechanism 25 includes the shock absorber rod 91 pivotally supported in an upwardly and downwardly swingable manner by the body frame F in a position under the pivot shaft 24, and the shock absorber arm 93 disposed between the pair of left and right rod portions 91b constituting the shock absorber rod 91. Of the shock absorber arm 93, a front end portion is connected to a lower end portion of the shock absorber unit 26, a rear upper end portion is connected to the swing arm 11, and a rear lower end portion is connected to a rear end portion of the shock absorber rod 91. In addition, the link guard 85 is disposed so as to cover at least an area ranging from a front end portion of the shock absorber rod 91 to the front end portion of the shock absorber arm 93 on the lower side of the area in such a manner so as to spread over the pair of left and right rod portions 91*b*, and is fixed at least to the pair of left and right rod portions 91*b*. According to this configuration, only the required minimal part of the link mechanism 25 is guarded by the link guard 85. Therefore, the link guard 85 can be made lighter in weight and compact, which also contributes to a reduction in the unsprung weight.

As has been shown in FIGS. 3, 6 and 9, the front end guard portion 85*a* constituting a front end portion of the link guard 85 is formed so as to upwardly enfold a front end portion of the shock absorber rod 91, and the front end guard portion 85*a* of the link guard 85 is bent in the vertical direction in cross-sectional shape. Therefore, the front end guard portion 85*a* can be restrained from coming off (turning over) to the lower side due to collision of an obstacle against the front end guard portion 85*a*. In addition, the front end guard portion 85*a* of the link guard 85 is bent in a cross-sectional shape so as to be protuberant toward the small-diameter portion 91*f*. More specifically, as shown in FIG. 9, the recessed portion 85*u* is recessed in relation to the left and right side portions 85*t* toward the small-diameter portion 91*f* side. This permits the front end guard portion 85*a* to have good rigidity. The rigidity thus secured, also, contributes to assured avoidance of the aforementioned coming-off (turning-over).

As has been depicted in FIGS. 3, 4 and 9, the bearing portion 91*a* constituting a front end portion of the shock absorber rod 91 includes the left and right large-diameter portions 91*e* provided with the pair of left and right needle bearings 112 as bearings on the inner sides thereof. The small-diameter portion 91*f* is provided integrally between the left and right large-diameter portions 91*e* and is smaller than the large-diameter portions 91*e* in an outside diameter. In addition, the front end guard portion 85*a* of the link guard 85 is bent in cross section so that the recessed portion 85*u* as a vehicle-width-directionally central portion thereof is protuberant toward the radially inner side of the small-diameter portion 91*f*, in such a manner so as to be along the shape of the front end portion of the shock absorber rod 91. Therefore, with the front end guard portion 85*a* of the link guard 85 thus bent to be along the shape of the shock absorber rod 91, the rigidity of the front end guard portion 85*a* can be enhanced while utilizing a dead space.

The front end guard portion 85*a* of the link guard 85 is provided, in positions corresponding to the small-diameter portion 91*f*, with the passing holes 85*m* through which to pass the binding bands 96 as string-like members. The binding bands 96 passed through the passing holes 85*m* are wound around the small-diameter portion 91*f*, whereby the front end guard portion 85*a* of the link guard 85 is supported on the bearing portion 91*a* of the shock absorber rod 91. Thus, the front end guard portion 85*a* of the link guard 85 can be bound by the binding bands 96. Accordingly, the aforementioned coming-off (turning-over) of the front end guard portion 85*a* to the lower side can be inhibited more assuredly. In addition, since the binding bands 96 are wound around the small-diameter portion 91*f*, the length of the binding bands 96 can be minimized.

The front end guard portion 85*a* constituting a front end portion of the link guard 85 includes the left and right side portions 85*t* formed so as to be along the left and right large-diameter portions 91*e*. The side portions 85*t* are formed to be larger in diameter than the binding bands 96 in the wound state. Thus, the side portions 85*t*, larger in diameter than the binding bands 96 in the wound state, are provided on both sides of the binding bands 96. Accordingly, the possibility of collision of a stump or a large rock against the binding bands 96 can be lowered. Consequently, the possibility of breakage of the binding bands 96 can be reduced.

As has been shown in FIGS. 3, 4 and 5, the link guard 85 extends further rearwardly from a front end portion of the shock absorber arm 93, and is provided with the mud-discharging hole 85*j* for discharging mud under the shock absorber arm 93. Therefore, the region guarded by the link guard 85 can be broadened. In addition, since the mud-discharging hole 85*j* is provided, mud or the like, if any, present in or clogging a gap between the link guard 85 and the shock absorber arm 93 will be discharged through the mud-discharging hole 85*j*, so that the mud or the like will not hinder the operation of the shock absorber arm 93.

As has been shown in FIG. 7, the link guard 85 has the slide surface portion 85*f* inclined at a forwardly upward gradient substantially along the straight line 109 which touches, from the front side in side view, both the bearing portion 91*a* constituting a front end portion of the shock absorber rod 91 and the front end bearing portion 93*g* constituting a front end portion of the shock absorber arm 93 connected to the shock absorber unit 26 being in a fully stretched state. Therefore, even when a rock, earth and sand or the like collides against the link guard 85, the shock of collision can be mitigated by the forwardly ascending slide surface portion 85*f*.

In addition, as has been depicted in FIG. 12, the link guard 85 has the left and right side walls 85*k*, which are formed with the stepped portions 85*s*, respectively. Therefore, the rigidity of the link guard 85 can be enhanced by the stepped portions 85*s*. In addition, with the stepped portions 85*s* thus provided, the volume of the inside of the link guard 85 can be reduced, whereby the amount of mud and the like accumulated inside the link guard 85 can be reduced. Consequently, an increase in the weight of the vehicle can be suppressed.

As has been illustrated in FIG. 10, the link guard 85 is formed with the intermediate extension guard portions 85*c* as a pair of left and right side portion extension portions extending sideways and upwardly from the left and right side walls 85*k*. The pair of left and right intermediate extension guard portions 85*c* (specifically, the vertical portions 85*r*) are disposed on laterally outer sides of the pair of left and right rod portions 91*b*. Therefore, the link guard 85 can be positioned in the vehicle width direction relative to the shock absorber rods 91 by the left and right intermediate extension guard portions 85*c*. Further, the link guard 85 can be positioned in the vertical direction relative to the shock absorber rods 91 by the horizontal portions 85*q* of the intermediate extension guard portions 85*c*.

The left and right side walls 85*k* are each provided with the plurality of passing holes 85*m* as band passing holes through which to pass the binding bands 96, and the intermediate extension guard portions 85*c* are fixed to the rod portions 91*b* by the binding bands 96 passed through the passing holes 85*m*. Therefore, the link guard 85 can be easily fixed to the rod portions 91*b* by the binding bands 96. In addition, the provision of the intermediate extension guard portions 85*c* ensures that the link guard 85 can be firmly fixed to the rod portions 91*b*.

As has been shown in FIGS. 5 and 11, the link guard 85 is formed with the pair of left and right rear end extension guard portions 85e as rear portion sideways extension portions extending sideways from the lower side of the connection portions between the rear end portions 91c of the shock absorber rod 91 and the rear lower end bearing portions 93b constituting the rear lower end portions of the shock absorber arm 93. Therefore, in the case where the rear end portions 91c of the shock absorber rod 91 and the rear lower end bearing portion 93b of the shock absorber arm 93 are connected by the connecting bolt 92, the head portion 92a of the connecting bolt 92 and the nut 101 screw-engaged with the tip portion of the connecting bolt 92 can be covered with, and protected by, the rear end extension guard portions 85e from below.

As illustrated in FIGS. 2 and 7, the rear upper end bearing portions 93c constituting a rear upper end portion of the shock absorber arm 93 is connected to the pair of left and right arm projecting portions 11a projecting downward integrally from a lower portion of the swing arm 11 to below the arm main body 11b in side view. Therefore, the link mechanism 25 is of a type wherein the shock absorber arm 93 and the shock absorber rod 91 are largely spaced downward from the arm main body 11b of the swing arm 11. Since the link guard 85 is mounted to the shock absorber rod 91, the link guard 85 may be smaller as compared with the case of the related art where a guard is mounted to a swing arm main body.

The aforementioned embodiment merely shows an exemplary mode for carrying out the present invention, and arbitrary modifications and applications of the invention are possible within the scope of the invention.

For instance, while the needle bearings have been shown in the drawings as bearings, they are not restrictive, and there can also be used ball bearings, pipe bushings, etc.

The present invention is applicable not only to motorcycles 1 but also to saddle type vehicles other than the motorcycles. Note that the saddle type vehicles include generally those vehicles which are driven by a driver seated astride a vehicle body, and thus include not only motorcycles (inclusive of motorbikes) but also those three-wheeled vehicles and four-wheeled vehicles which are classified as ATVs (all terrain vehicles).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A link mechanism protection structure for a saddle vehicle comprising:
   a body frame;
   a swing arm having a front end portion pivotally supported in an upwardly and downwardly swingable manner by a pivot shaft disposed at a lower portion of the body frame, the swing arm being adapted to support a rear wheel in a rotatable manner on a rear end portion thereof;
   a shock absorber unit adapted to restrict an amount of swinging of the swing arm relative to the body frame, the shock absorber unit having an upper end portion connected to the body frame; and
   a link mechanism connected to a lower end portion of the shock absorber unit, to the swing arm and to the body frame, a link guard being disposed under the link mechanism;

wherein the link mechanism includes:
   a shock absorber rod pivotally supported in an upwardly and downwardly swingable manner by the body frame in a position under the pivot shaft; and
   a shock absorber arm disposed between a pair of left and right rod portions constituting the shock absorber rod, a front end portion of the shock absorber arm being connected to a lower end portion of the shock absorber unit, a rear upper end portion of the shock absorber arm being connected to the swing arm, and a rear lower end portion of the shock absorber arm being connected to a rear end portion of the shock absorber rod; and
the link guard is disposed to cover at least an area ranging from a front end portion of the shock absorber rod to the front end portion of the shock absorber arm on a lower side of the area in such a manner to spread over the pair of left and right rod portions, and is fixed at least to the pair of left and right rod portions,
wherein the front end portion of the shock absorber rod includes left and right large-diameter portions each provided with a bearing inside thereof, and a small-diameter portion provided integrally between the left and right large-diameter portions that is smaller than the large-diameter portions in outside diameter, and
wherein a front end portion of the link guard is bent in cross section wherein a central portion thereof, with respect to a vehicle width direction, projects toward a radially inner side of the small-diameter portion, in such a manner to be along the shape of the front end portion of the shock absorber rod.

2. The link mechanism protection structure for the saddle vehicle according to claim 1, wherein the front end portion of the link guard is formed to upwardly enfold a front end portion of the shock absorber rod, and the front end portion of the link guard is bent in cross-sectional shape.

3. The link mechanism protection structure for the saddle vehicle according to claim 1, wherein the front end portion of the link guard is provided, in a position corresponding to the small-diameter portion, with a passing hole through which to pass a string-like member, and the string-like member passed through the passing hole is wound around the small-diameter portion, whereby the front end portion of the link guard is supported on the front end portion of the shock absorber rod.

4. The link mechanism protection structure for the saddle vehicle according to claim 1, wherein a front end guard portion constituting the front end portion of the link guard includes left and right side portions formed to be along the left and right large-diameter portions, and the side portions are formed to be larger in diameter than the string-like member in the wound state.

5. The link mechanism protection structure for the saddle vehicle according to claim 3, wherein a front end guard portion constituting the front end portion of the link guard includes left and right side portions formed to be along the left and right large-diameter portions, and the side portions are formed to be larger in diameter than the string-like member in the wound state.

6. The link mechanism protection structure for the saddle vehicle according to claim 1, wherein the link guard extends further rearwardly from the front end portion of the shock absorber arm, and is provided with a mud-discharging opening under the shock absorber arm.

7. The link mechanism protection structure for the saddle vehicle according to claim 2, wherein the link guard extends further rearwardly from the front end portion of the shock absorber arm, and is provided with a mud-discharging opening under the shock absorber arm.

8. The link mechanism protection structure for the saddle vehicle according to claim 1, wherein the link guard has a slide surface portion inclined at a forwardly upward gradient substantially along a straight line which touches, from front side in side view, both the front end portion of the shock absorber rod and the front end portion of the shock absorber arm connected to the shock absorber unit being in a fully stretched state.

9. The link mechanism protection structure for the saddle vehicle according to claim 2, wherein the link guard has a slide surface portion inclined at a forwardly upward gradient substantially along a straight line which touches, from front side in side view, both the front end portion of the shock absorber rod and the front end portion of the shock absorber arm connected to the shock absorber unit being in a fully stretched state.

10. The link mechanism protection structure for the saddle vehicle according to claim 1, wherein the link guard has left and right side walls, and the side walls are each formed with a stepped portion.

11. The link mechanism protection structure for the saddle vehicle according to claim 2, wherein the link guard has left and right side walls, and the side walls are each formed with a stepped portion.

12. The link mechanism protection structure for the saddle vehicle according to claim 10, wherein the link guard is formed with a pair of left and right side portion extension portions extending sideways and upward from the left and right side walls, and the pair of left and right side portion extension portions are disposed on laterally outer sides of the pair of left and right rod portions.

13. The link mechanism protection structure for the saddle vehicle according to claim 10, wherein the left and right side walls are each provided therein with a plurality of passing holes through which to pass string-like members, and the side portion extension portions are fixed to the rod portions by the string-like members passed through the passing holes.

14. The link mechanism protection structure for the saddle vehicle according to claim 12, wherein the left and right side walls are each provided therein with a plurality of passing holes through which to pass string-like members, and the side portion extension portions are fixed to the rod portions by the string-like members passed through the passing holes.

15. The link mechanism protection structure for the saddle vehicle according to claim 6, wherein the link guard is formed with a pair of left and right rear portion sideways extension portions extending sideways from a position under a connection portion between a rear end portion of the shock absorber rod and the rear lower end portion of the shock absorber arm.

16. The link mechanism protection structure for the saddle vehicle according to claim 8, wherein the link guard is formed with a pair of left and right rear portion sideways extension portions extending sideways from a position under a connection portion between a rear end portion of the shock absorber rod and the rear lower end portion of the shock absorber arm.

17. The link mechanism protection structure for the saddle vehicle according to claim 1, wherein the rear upper end portion of the shock absorber arm is connected to an arm projecting portion projecting downwardly and integrally from a lower portion of the swing arm to below an arm main body in side view.

* * * * *